US008499311B2

(12) United States Patent
Blohm et al.

(10) Patent No.: US 8,499,311 B2
(45) Date of Patent: Jul. 30, 2013

(54) WEB CONTAINER EXTENSION CLASSLOADING

(75) Inventors: Henning Blohm, Walldorf (DE); Michael Herrmann, Heidelberg (DE); Laurent Guiraud, Le Broc (FR); Maria Jurova, Sofia (BG); Violeta Georgieva, Sofia (BG)

(73) Assignee: SAP AG, Walldorf (DE)

( * ) Notice: Subject to any disclaimer, the term of this patent is extended or adjusted under 35 U.S.C. 154(b) by 1212 days.

(21) Appl. No.: 11/647,812

(22) Filed: Dec. 29, 2006

(65) Prior Publication Data

US 2008/0162493 A1 Jul. 3, 2008

(51) Int. Cl.
*G06F 3/00* (2006.01)
*G06F 15/16* (2006.01)

(52) U.S. Cl.
USPC ............ 719/328; 719/311; 709/202; 709/203

(58) Field of Classification Search
None
See application file for complete search history.

(56) References Cited

U.S. PATENT DOCUMENTS

| | | | | |
|---|---|---|---|---|
| 6,961,855 B1 * | 11/2005 | Rich et al. | .......................... | 726/1 |
| 7,694,140 B1 * | 4/2010 | Sachenko et al. | ............. | 709/203 |
| 7,788,338 B2 * | 8/2010 | Savchenko et al. | ........... | 709/202 |
| 7,870,568 B2 * | 1/2011 | Bernardin et al. | ............ | 719/328 |
| 2002/0178214 A1 * | 11/2002 | Brittenham et al. | ......... | 709/203 |
| 2003/0033369 A1 * | 2/2003 | Bernhard | ...................... | 709/203 |
| 2003/0110315 A1 * | 6/2003 | Upton | ........................... | 719/328 |
| 2003/0158918 A1 * | 8/2003 | Hanis | ........................... | 709/220 |
| 2003/0204645 A1 * | 10/2003 | Sharma et al. | ................ | 709/328 |
| 2004/0153996 A1 * | 8/2004 | Boykin et al. | ................ | 717/118 |
| 2004/0221001 A1 * | 11/2004 | Anagol-Subbarao et al. | ............................. | 719/311 |
| 2005/0125809 A1 * | 6/2005 | Chessell | ....................... | 719/318 |
| 2005/0262477 A1 * | 11/2005 | Kovachka-Dimitrova et al. | ............................. | 717/118 |
| 2005/0278338 A1 * | 12/2005 | Todorova et al. | ............... | 707/10 |
| 2006/0037030 A1 * | 2/2006 | Kovachka-Dimitrova et al. | ............................. | 719/328 |
| 2006/0123067 A1 * | 6/2006 | Ghattu et al. | .................. | 707/203 |
| 2007/0033273 A1 * | 2/2007 | White et al. | .................. | 709/223 |
| 2007/0038986 A1 * | 2/2007 | Houser | ......................... | 717/151 |

OTHER PUBLICATIONS

"Interoperable Web Services for Computational Portal", Marlon Pierce, 2002, pp. 1-12.*
"Building Web Services", Sun One Studio 5 programming Series, 2003, pp. 1-222.*
"Model Driven Design and Deployment of Service-Enable Web Application", Ioana Manolescu, 2006, pp. 1-41.*
Designing WebSphere Application Server for Performance: An evolutionay approach, R. Willenborg, 2002, pp. 1-24.*
""EAR (File format)"", Wikipedia [Online] XP002474244 Retrieved from the Internet: URL:http://en.wikipedia.org/w/index.php?title=EAR_%28file_format%29&oldid=91934160>
[retrieved on Mar. 18, 2008] the whole document, (Dec. 4, 2006), 1-3.
""JAVA class loader"" Wikipedia [Online] Retrieved from the Internet: URL:http://en.wikipedia.org/w/index.php?title=Java_Classloader&oldid=96417246>[retrieve on Mar. 28, 2008] the whole document, (Dec. 25, 2006), 1-2.

(Continued)

Primary Examiner — Tuan Dao
(74) Attorney, Agent, or Firm — Schwegman Lundberg & Woessner, P.A.

(57) ABSTRACT

A system and method for integrating a diverse set of web/remote user interface technologies into one runtime architecture using a Web container extension is described. This integration simplifies execution, cross-usage, and technology integration between different user interface technologies and other application server offerings.

20 Claims, 12 Drawing Sheets

OTHER PUBLICATIONS

""Java Servlet"" Wikipedia [Online] pp. 1-5, XP002474241 Retrieved from the Internet: URL:http://en.wikipedia.org/w/index.php?title=Java_Servlet&oldid=960746447> [retrieved on Mar. 28, 2008] the whole document p. 1, lines 5-10, (Dec. 23, 2006), 1-5.

""Sun WAR (File format)"" Wikipedia [Online], XP 002474243 Retrieved from the Internet: URL:http://en.wikipedia.org/w/index.php?title=Sun_WAR_%28file_format%29&oldid=93304611> [retrieved on Mar. 28, 2008] the whole document, (Dec. 10, 2006), pp. 1-2.

""Web container"", Wikipedia: [Online] XP002474242 Retrieved from the Internet: URL:http://en.wikipedia.org/w/index.php?title=Web_container&oldid=90005192> [retrieved on Mar. 28, 2008] the whole document, (Nov. 25, 2006), pp. 1-1.

PCT Search Report mailed Apr. 18, 2008, 3 Pages.

Written Opinion mailed Apr. 18, 2008, 7 Pages.

\* cited by examiner

WEB CONTAINER EXTENSION CLASSLOADING

FIELD OF INVENTION

The field of invention relates generally to the software arts, and, more specifically, to extending the programming model of Web services containers.

BACKGROUND

Figure 1:
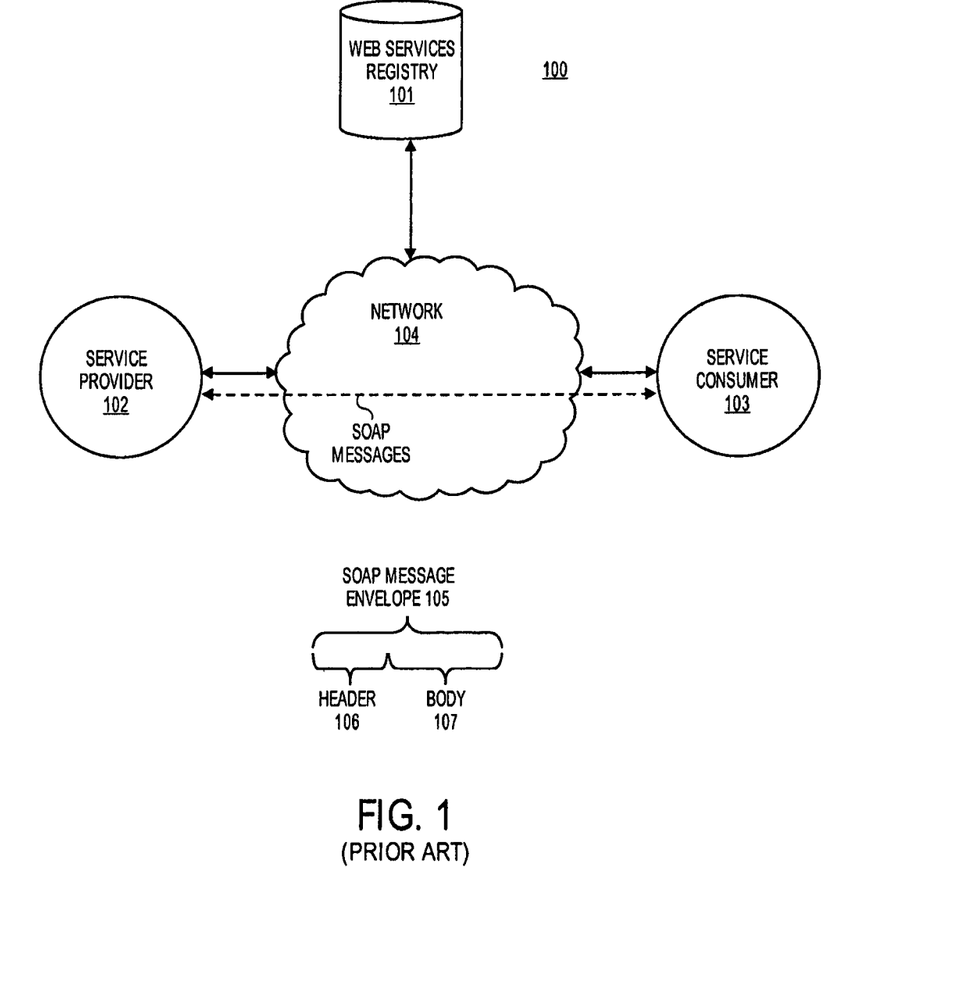
FIG. 1 shows a web services model.

The term "web services" can be viewed as a technology for engaging in business relationships (e.g., buying and selling) in a partially or wholly automated fashion over a network such as the Internet. FIG. 1 shows a web services model 100 that includes a registry 101, a service provider 102 and a service consumer 103. A service consumer 103, or "service requester", is generally understood to be an entity that seeks and (in cases where a suitable web service is found) uses a particular web service through a network 104.

The registry 101 includes listings of various "available" services, and, may assist the service consumer 103 in searching for a suitable service provider based on the web servicing needs of the service consumer 103. A service provider 102 is the provider of one or more web services that can be accessed over the network 104. Because of the vast expanse of the Internet and interest in automated business engagements, many registries, service consumers and service providers may be in operation at any instant of time.

Presently, the responsibilities of the most prevalent registry function 101 that is associated with the web services effort are defined in various Universal Discovery, Description and Integration (UDDI) specifications provided by uddi.org. Besides providing listings of available services, a UDDI registry 101 may also make available to a service consumer 103 additional details that pertain to any particular web service such as: 1) the location of the web service (e.g., its URI specified by a specific network destination address or name); 2) the capabilities of the web service (e.g., specific methods that are supported by the web service and that may be called upon by the service consumer), and, 3) communication semantics needed for invoking the web service through the network 104 (e.g., the structure of a messaging format and/or protocol needed to properly communicate with the web service).

According to one widely adopted approach, such "additional details" are described in web services Directory Language (WSDL) text documents written in eXtensible Markup Language (XML). Here, for example, for each web service that the registry 101 maintains a listing of, the registry 101 also maintains a WSDL document that describes the location, capabilities and communication semantics of the web service. Presently, a WSDL document for a particular web service is expected to include an "abstract interface" description of the web service (which includes the web service's methods and the data passed between the web service provider and web service consumer) and a "concrete implementation" description of the web service (which includes specific protocol and data format specifications for communicating with the web service (referred to as a "binding") and the location of the web service (referred to as a "port")).

According to another widely adopted approach, with respect to the actual communication that occurs between the service consumer 103 and the service provider 102, such communication is implemented through an exchange of Simple Object Access Protocol (SOAP) text messages written in XML.

Efforts are being made to more easily conduct business in a web-based environment. "Web Services" is loosely understood to mean the ability to discover and conduct business in a web-based environment. For example, a user (e.g., a web-based application or person with a web browser) may: 1) search through an online registry of businesses and/or services; 2) find a listing in the registry for web based access to a service that that the user desires to have performed; and then, 3) engage in a web based business relationship with the service application including the passing of relevant information (e.g., pricing, terms, and conditions) over the network. In other words, web services generally refer to offerings of services by one application to another via the World Wide Web.

Given the nature and use of web services and the rapid increase in their demand, interoperability of web services across clients and servers is becoming increasingly important and cumbersome. Some attempts have been made to achieve interoperability across a wide range of platforms and runtimes. For example, using open standards like eXtensible Markup Language (XML), Simple Object Access Protocol (SOAP), Web Services Description Language (WSDL), and Universal Description, Discovery, and Integration (UDDI), some interoperability has been achieved.

A Web application runs within a Web container of a Web server. The Web container provides the runtime environment through components that provide naming context and lifecycle management. Some Web servers may also provide additional services such as security and concurrency control. A Web server may work with an EJB server to provide some of those services. Web containers are also sometimes called Web engines. Like the other Java APIs, different vendors provide their own implementation.

Web applications are composed of web components and other data such as HTML pages. Web components can be servlets, JSP pages created with the JavaServer Pages™ technology, web filters, and web event listeners. These components typically execute in a web server and may respond to HTTP requests from web clients. Servlets, JSP pages, and filters may be used to generate HTML pages that are an application's user interface. They may also be used to generate XML or other format data that is consumed by other application components.

Different deployable modules can be embedded within an EAR file including Java Archives (JAR) that house Java classes or EJBs and Web Archives (WAR). WAR files are used to distribute Web applications (including classes). WARs may contain JSPs, HTML, XML, servlets, etc. Current WAR files also have a typical directory structure with particular files. A WAR contains a WEB-INF directory that has a "web.xml" file that defines the structure of the web application of the WAR. For a web application that utilizes servlets, the servlet container uses the web.xml to determine to which servlet a request should be routed. The web.xml also defines the context variables which can be referenced within the servlets and it is used to define environmental dependencies which are to be configured.

Unfortunately, traditionally deployed Web services suffer from several problems. For each application and/or container that is deployed a different programming model is applied. That means that each deployed archive or application handles contexts, class loading, security, etc. in their own ways. There is also not an Application Programming Interface (API) that can be used to translate commands between the different Web services and the runtime executing them.

BRIEF DESCRIPTION OF THE FIGURES

The present invention is illustrated by way of example, and not limitation, in the figures of the accompanying drawings in which like references indicate similar elements and in which.

SUMMARY

A system and method for integrating a diverse set of web/remote user interface technologies into one runtime architecture using a Web container extension is described. This integration simplifies execution, cross-usage, and technology integration between different user interface technologies and other application server offerings.

DETAILED DESCRIPTION

As described earlier, prior art systems did not support a common programming model. Because of this, prior art systems required separate deployment models (packaging), different handling during runtime, etc. Essentially, each deployed Web (Internet based) application had to start from scratch and could not use the same techniques as the other Web applications.

System Architecture

Figure 2:
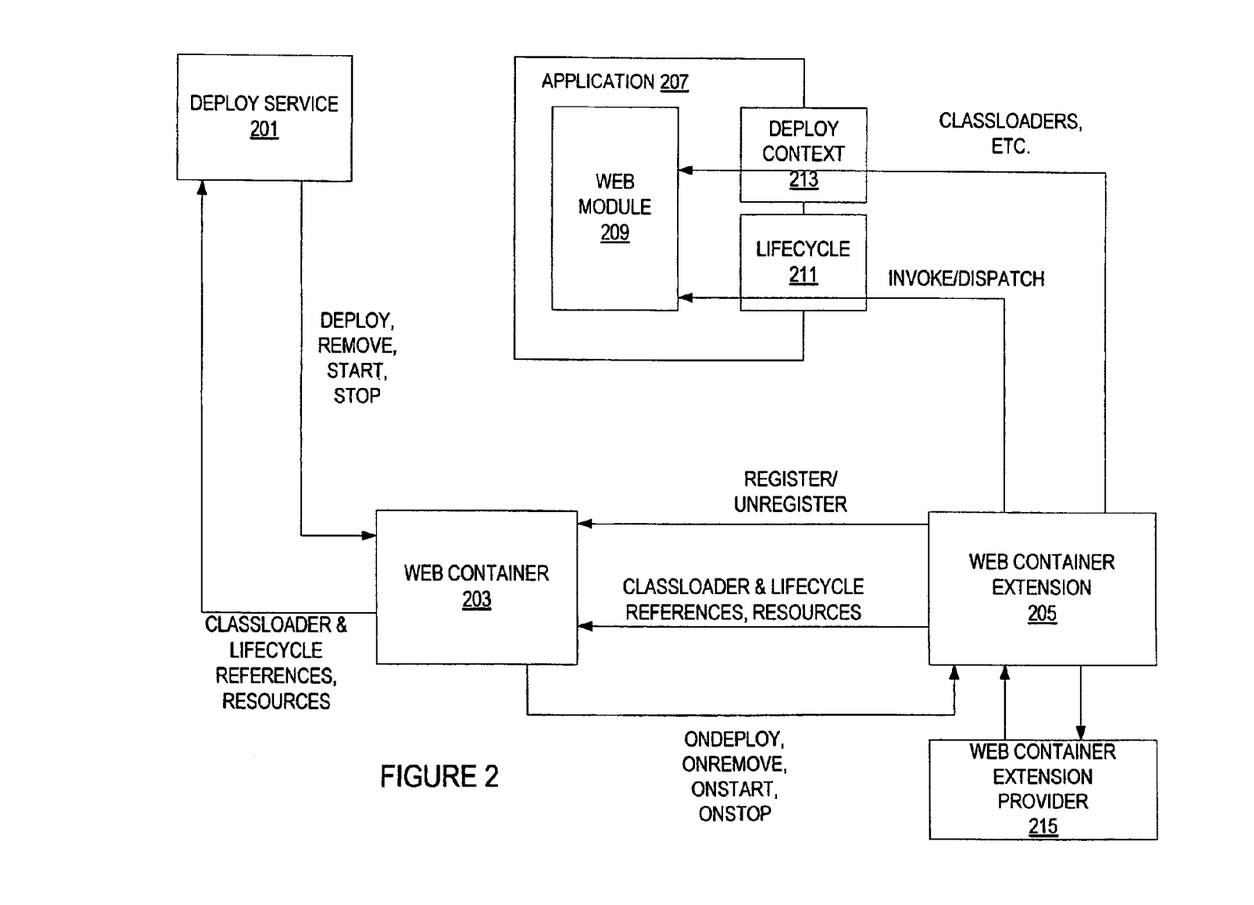
FIG. 2 illustrates an embodiment of an architecture that supports Web container extension (WCE)

FIG. 2 illustrates an embodiment of an architecture that supports Web container extension (WCE). Through this architecture the contract between a Web container and other engine services may integrate as a container for web-like programming models. There are many benefits to this integration: the Web container is the central place to handle static web resources of an application, including the programmatic extensions like filters; the Web container offers session management on the web application level; the Web container handles declarative security for resources and role-usage (role-refs); the Web container offers tight integration with the J2EE application model (JNDI bindings for resource lookups, EJB references, etc.); and the WAR file becomes the base deployment format.

Through a deploy service module 201 a particular web module may be deployed, started, stopped, or removed. The deploy service module 201 includes a deploy container API that allows the deploy service AA01 to interface with different Web containers using common commands.

The Web container module 203 runs a Web application. An exemplary Web container 203 is a servlet service. The Web container 203 receives classloader and lifecycle references and resources from the Web container extension (WCE) 205 and passes this information to the deploy service 201. In an embodiment, the Web container 203 is an implementation of a container of J2EE Web components such as a servlet service. It complies with the Java Servlet 2.3 Specification and JavaServer Pages 1.2 Specification and accordingly observes certain J2EE standards and provides all functions required by these standards.

One of the most important functions of the Web container 203 is to enable the lifecycle management of Web applications. It also helps developing and running session and security-aware Web applications. The Web container 203 manages J2EE Web components across a cluster environment, generates dynamic responses, and so on. It also is used to deliver requests and transfer response data back to the client.

The Web container transmits onDeploy, onRemove, onStart, and onStop commands/method calls and information to the WCE 205. Typically these are transmitted in response to deploy, remove, start, and stop commands received from the deploy service 201. The onDeploy method is called at the end of web module deployment before returning application deployment information on the server node which is processing the actual deployment. The WCE 205 may return from an application or module, or be provided with by the Web container 203, 1) file names which will be added to the public and private classloaders during startup of the application, 2) public and private references to the server components, and 3) public and private resource references that a web module provides.

The on Remove method is called before the web module is about to be removed or when rollback to a previous state is needed. The on Start method is called when an application context of a web module is initialized on the server nodes where the application will be started (used to start an application). The on Stop this method is called on a server node before application context of the web module is about to be destroyed or when roll back has been called for (used to stop an application).

The WCE 205 is an engine service that acts as an intermediary between a Web container 203, web container extension provider 215, and an application 207. Typically, applications 207 are J2EE applications. Through the WCE 205 deployment, request dispatching, lifecycle management, and application information of an application handled or processed. The Web container extension 205 mechanism abstracts web module lifecycle and deployment and offers request dispatch into the web module context, so that engine services that implement the Web container extension API only need to know about their programming model and not the programming models of others.

Each Web container extension 205 creates an instance of a deployment information class for every process of deployment. Through this instance Web container extensions 205 pass all the relevant information to the Web container 203 such as 1) files to be added to the application and private classloaders and public and private references to the server components and 2) public and private resource references and resource references that module provides.

The onDeploy and onRemove commands are passed by the WCE 205 to the web interface 209 through a deployment context module 213. Classloaders, etc. are passed to the Web module through the WCE 205. Information such as application name and vendor name may also be passed though. The onStart and onStop methods are passed through the lifecycle interface 211. While the illustrated embodiment shows the deployment context interface 213 and lifecycle interface 213 as being a part of the application 207, they may alternatively be part of the WCE 205.

Typically, the Web container 203 provides an API that allows registration/unregistration of a WCE 205 and so that lifecycle information can be propagated to the Web container extension 205 and the Web container extension 205 in turn can propagate data like additional application references and resources to the Web container 203. WCEs 205 have a descriptor name during their registration so that a particular WCE 205 will only listen for events connected with its descriptor name. A Web container 203 creates a WCE ID, which is used for unregistering and during the registration of the WCEs 205. A Web container 203 will unregister all WCEs 205 during service stopping. Normally care should be taken to not deploy Web modules 209 before deploying or starting its respective WCE 205 so that the Web container 203 knows that there is an extension to serve this module.

The WCE provider 215 provides the WCE 205 and may send and receive commands and information with an application 207 and/or the Web container. Exemplary WCE providers 215 include portal engines. WCE 215 providers should also be registered with the Web container 203. This registration may include providing the Web container 203 with an implementation of the WCE 205, the WCE provider name, and a descriptor name or module type which the WCE provider 215 is interested in. Registration is needed so that problems that may arise when a specific WCE provider 215 is not deployed or started, but modules that belong to it are deployed, may be avoided.

Figure 3:
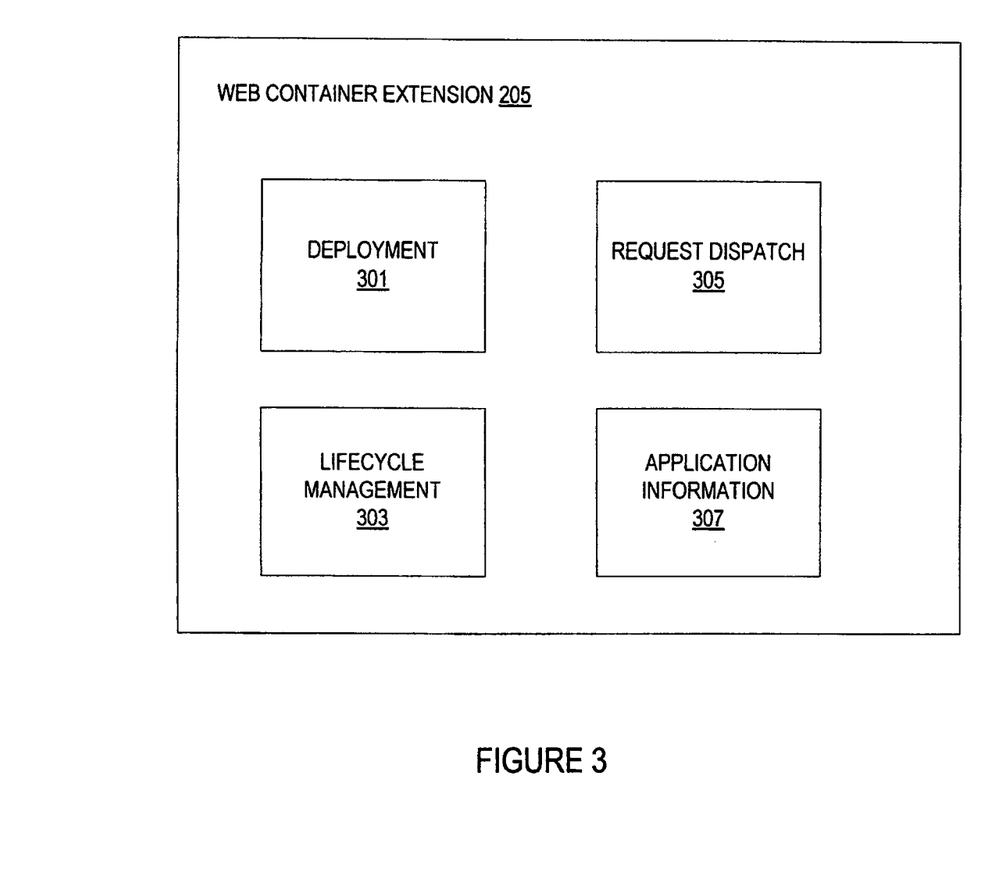
FIG. 3 illustrates an embodiment of a WCE module.

FIG. 3 illustrates an embodiment of a WCE module 205. This exemplary module includes a deployment interface 301, request dispatch interface 305, lifecycle management interface 303, and an application information interface 307. As described earlier, the deployment interface 301 passes onDeploy and onRemove commands and receives any responses; the lifecycle management interface 303 passes onStart and onStop and receives any responses; and the application information interface 307 passes application and vendor name requests and responses and is aware of the runtime context associated with an application. The request dispatch interface 305 passes application requests and responses from Web containers to applications and web modules.

WCE Classloading Model

Improvements to the general classloading model may also be used with the WCE architecture. The WCE classloading model uses a public loader for the public parts of an EAR and a private loader for private parts of a web module of the EAR. A private classloader's parent is the public classloader. This model provides isolation between private web modules (it is generally not desirable for a private web application to share its data with others, for example, it is not desirable when using a web-based banking website to have one's personal information available to everyone else using that website), the ability to have different classes with the same name (each private web module can use the same class name but have the class associated with it only), and provides for private loader references.

Figure 4:
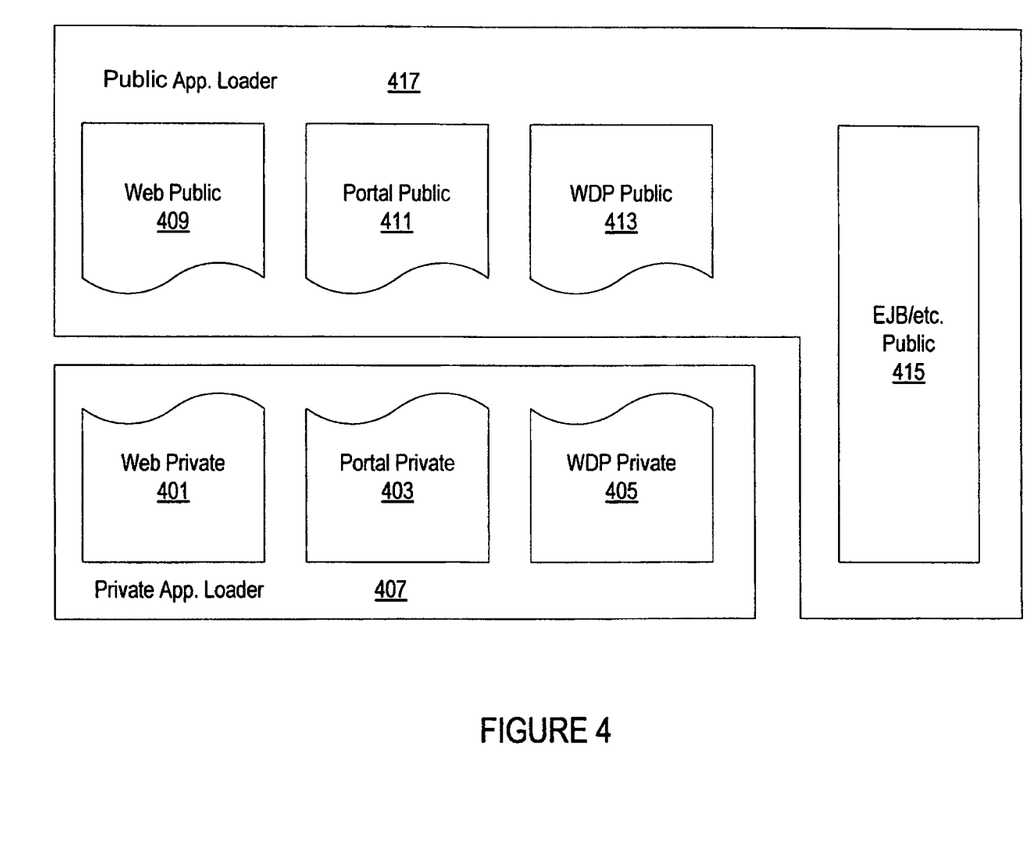
FIG. 4 illustrates an embodiment the WCE public and private classloader model.

FIG. 4 illustrates an embodiment the WCE public and private classloader model. The public application loader 417 includes public Web classes 409, portal classes 411, EJB classes 415, other classes 413 (such as WebDynPro an SAP application), etc. The private loader 407 includes several private classes 401, 403, 405 that are privately associated with their counterpart public classes.

Figure 5:
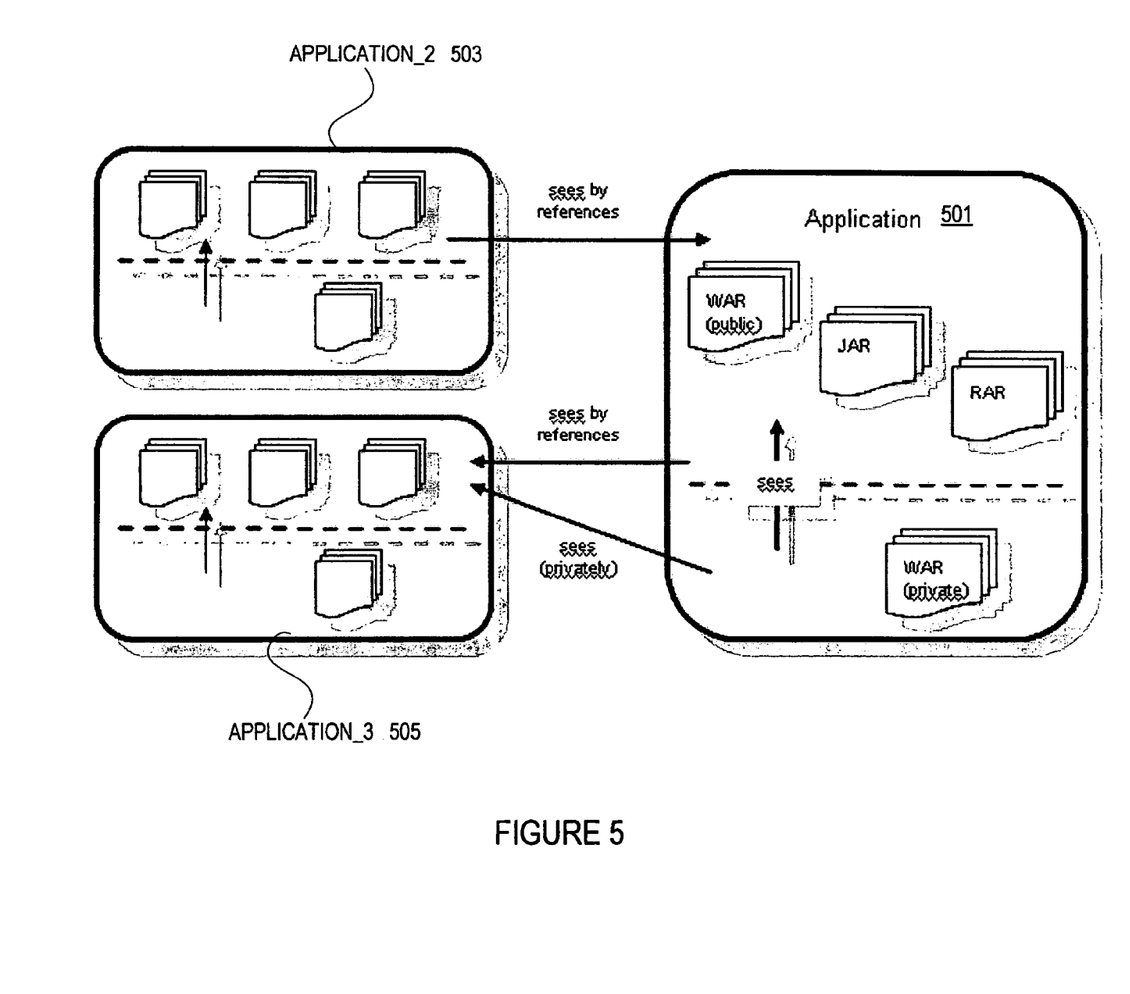
FIG. 5 illustrates WCE public and private classloading/class visibility.

FIG. 5 illustrates WCE public and private classloading/class visibility. Application_1 501 includes public classes (WAR, JAR, RAR) and private classes (WAR). The private WAR class of application_1 501 may "see" the public classes of application_1 501 and application_3 505. This means that the private classes are able to see or utilize the classes of the public classloader as necessary. Similarly, the private classes of the other applications 503, 505 may see their respective public classes. The private classes of application 501 may also see other public classes that they are aware of.

The public classes of each application 501, 503, 505 may also see the public classes of the other applications 501, 503, 505. For example, the WAR public class of application_1 may see the public classes of application_3 505 as necessary. However, private classes of an application remain private to that application. They are not accessible directly or indirectly by other public or private classes or classloaders.

Figure 6:
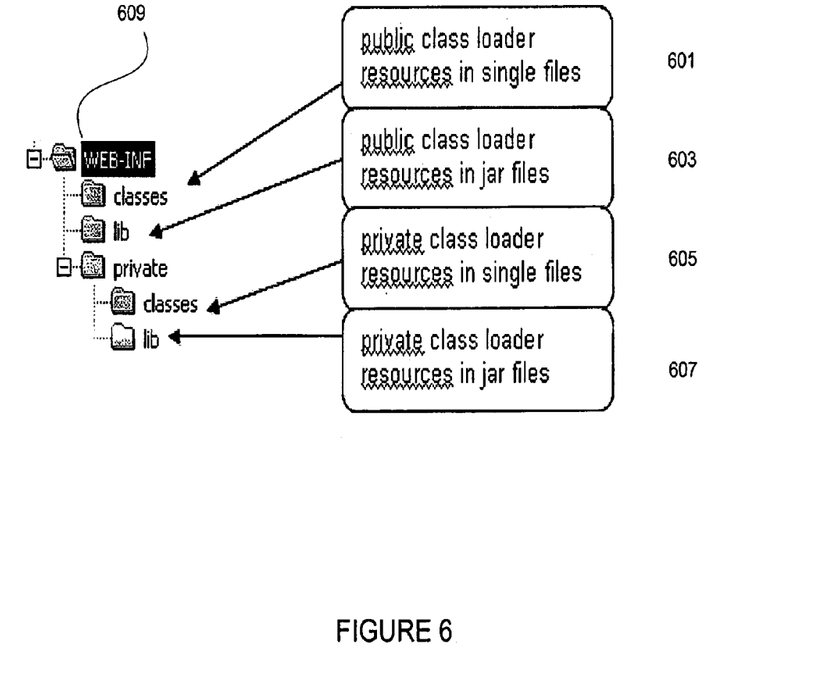
FIG. 6 illustrates an exemplary public and private classloader file system structure.

FIG. 6 illustrates an exemplary public and private classloader file system structure. This file structure 609 is based on the typical EAR structure used in Web services. The normal public classloaders 601, 603 and standard web application deployment and configuration descriptors (not shown) are included in the EAR 609. Exemplary deployment and configuration descriptors include, but are not limited to: servlet/context initial parameters, session configuration, servlet/JSP definitions, servlet/JSP mappings, application lifecycle classes, filter definitions and filter mappings, MIME type mappings, security, and syntax for looking up JNDI objects. Additionally, the file structure 609 includes private classloaders and classes 605, 607 that were not found in prior art file structures.

Application Deployment

Figure 7:
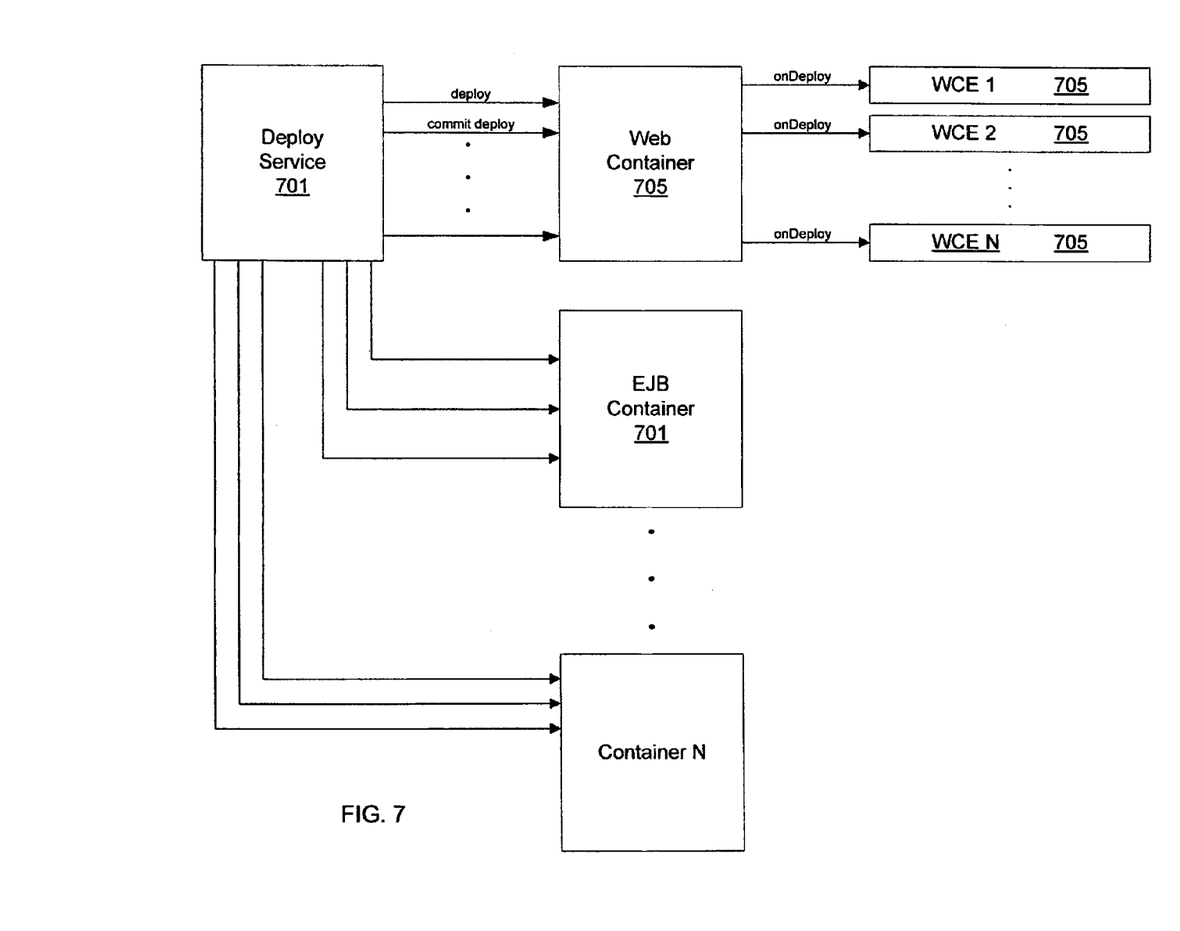
FIG. 7 illustrates an embodiment of deployment of an application.

FIG. 7 illustrates an embodiment of deployment of an application. The deployment service 201 communicates with the Web container 203 using several different methods as described earlier. These commands include deploy, commit a deployment of, start, stop, or remove a web module. For deployment of an application deploy and commit are used. The Web container 203 uses the onDeploy method to get through the WCE 205 information about the objects to be used by a Web module. The onDeploy method is called for each WCE to be deployed and used. Similar deployment schemes may be used with other containers such as EJB containers 701.

Figure 8:
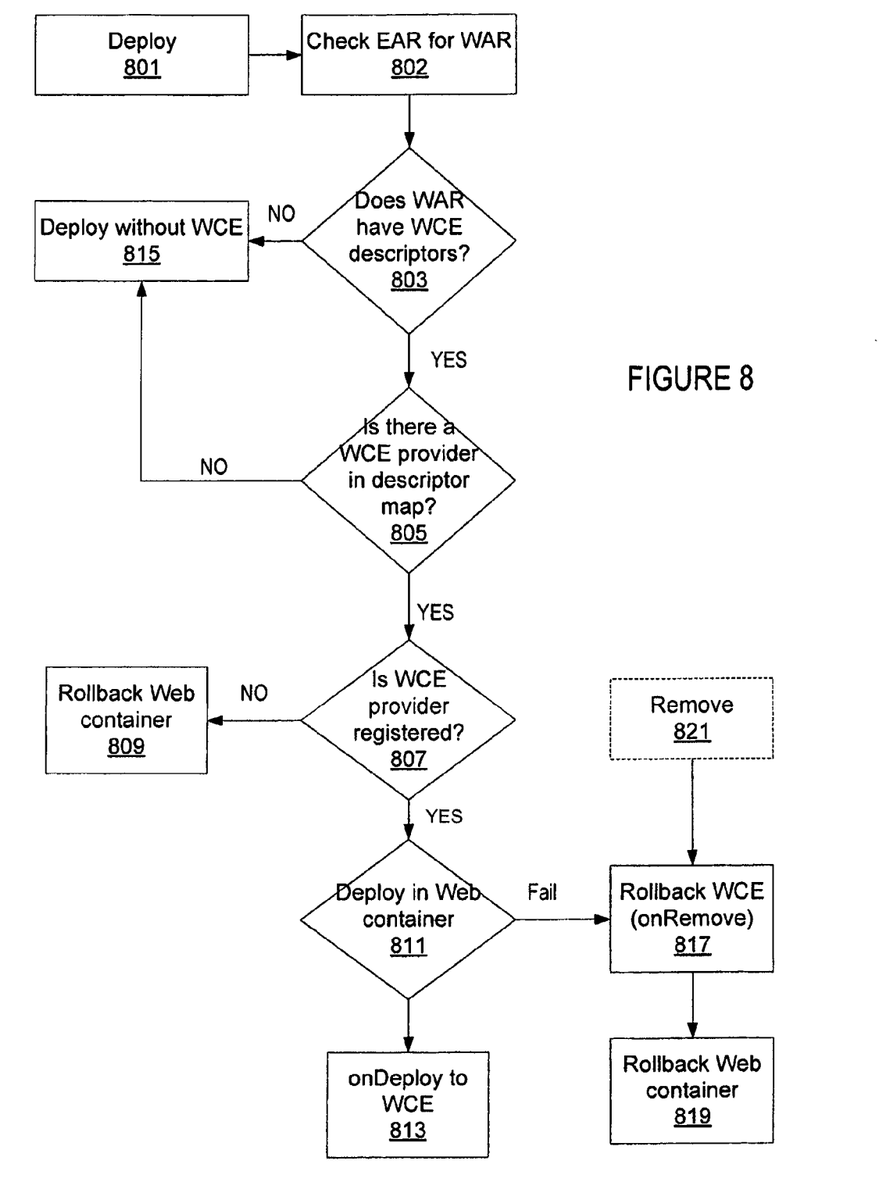
FIG. 8 illustrates an embodiment of deployment and removal of a Web module or application.

FIG. 8 illustrates an embodiment of deployment and removal of a Web module or application. A deploy command is issued by the deploy service 201 to a Web container 203 at 801.

The archive (EAR) is checked for a WAR file by the Web container 203 at 802. If the EAR does not have WAR file then it does not have an application or module to deploy and deployment stops.

For each WAR in the archive, a check is performed to determine if WCE descriptors are contained in the WAR by the Web container 203 at 803. This check ensures that the WAR has the proper descriptors (files) to deploy using a WCE. If it does not then deployment may be made without the use (and benefits) of WCE at 815. Deployment descriptors describe the behavior of the application/module to be deployed with respect to transactions, security, state management, etc. Dependencies on other components and resources are also described in the deployment descriptors.

If the proper descriptors are in the WAR, the descriptor map of the WAR is checked by the Web container 203 for WCE providers at 805. If there is not a provider in the map deployment without WCE support may be made at 815.

If there is a provider in the map then a determination of whether the provider has been registered with the runtime is made at 807. If a provider has not been registered, then deployment is rejected and deployment of the Web container deploying the application or module is rolled back at 809. This means the Web container returns to the state that it was at prior to the attempted deployment. This prior state is typically saved (either locally or persisted to a database) prior to deployment activities.

If the provider has been registered, then it is okay to deploy (a Web container will know who to communicate with) with the registered WCE provider. The Web container performs some deployment functions at 811 such as registering public and private classloaders associated with the application to be deployed.

The Web container registers the following files to the public (application) classloader (if they exist) during deployment of an application:
WEB-INF/classes
WEB-INF/lib/*.jar
WEB-INF/lib/*.zip The Web container also registers the following files to the private classloader (if they exist) during deployment of an application:
WEB-INF/private/classes
WEB-INF/private/lib/*.jar
WEB-INF/private/lib/*.zip WCEs may also register other files to the public and/or private classloaders during onDeploy. Typically, public and private classloaders are created during startup of the application. In an embodiment, a private classloader will not be created if there is neither WEB-INF/private nor files registered from any WCE. In contrast, the public classloader always will be created. A caveat, the folder where a Web container extracts the WAR file is within its specific knowledge (Web container can decide to change it in the future) so WCEs should not be reliant on getting resources from the file system but should get resources only from the public/private classloaders.

The onDeploy command is given to the WCE at 813. If this is successful then the application has been successfully deployed.

If there are any problems with deployment both the WCE provider at 817 (through on Remove) and Web container at 819 (through Remove) need to be rolled back to the state that they were at prior to the attempted deployment. Again, the prior state is typically saved prior to any attempted deployment of an application or module.

For normal removal of an application the deploy service 201 sends a remove command to the Web container responsible for the application at 821. The Web container 203 sends an on Remove command to the WCE 205 to remove the application from the system at 817. The Web container 203 then removes the information that it has regarding the application and/or WCE at 819 and rolls back its state.

In an embodiment, any checking of the EAR or WAR for descriptors or information in descriptors may be performed in either the deploy service 201 or Web container 203.

Application Lifecycle

Figure 9:
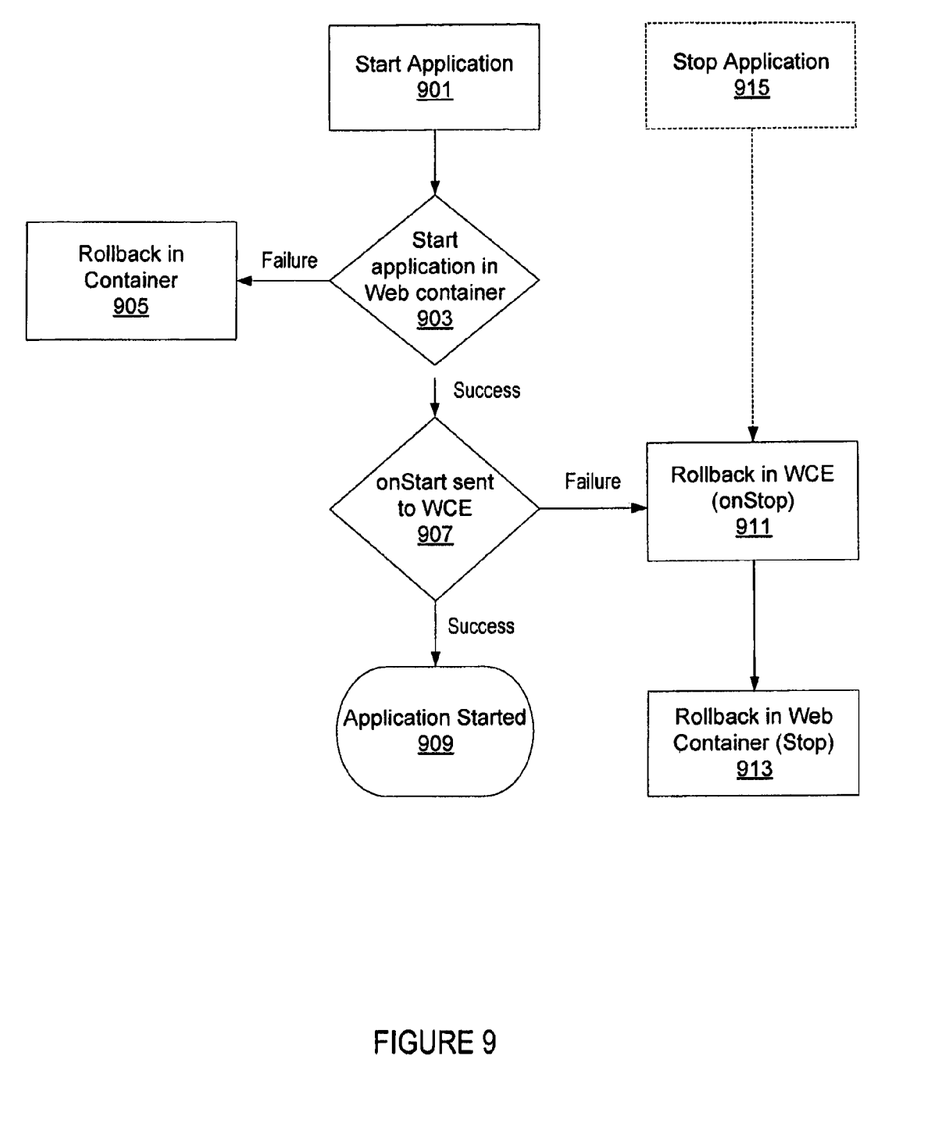
FIG. 9 illustrates an embodiment of a Web module or application's lifecycle.

FIG. 9 illustrates an embodiment of a Web module or application's lifecycle. An application's lifecycle includes starting and stopping. A start application command is issued by the deploy service 201 to a Web container 203 at 901.

The Web container 203 attempts to start the application at 903. The Web container 203 performs the necessary tasks such as allocating resources and checking for dependencies at this point. If the Web container 203 cannot perform these tasks successfully the container 203 is rolled back to its prior state at 905.

If the Web container 203 is able to perform these tasks successfully it sends an onStart command to the WCE 205 that is associated with the application 207 at 907. The application 207 may be successfully started at 909 or have problems starting and require rollback. If rollback is required, the WCE 205 is given an onStop command from the Web container 203 at 911. The Web container 203 is then rolled back at 913 to a previous state.

To stop an application 207, the deploy service 201 issues a stop application command to the Web container 203 responsible for the application 207 at 915. The WCE 205 is given an onStop command from the Web container 203 at 911 and the Web container 203 is then rolled back at 913 to a previous state and the application 207 is stopped.

Request Dispatching

Systems following a WCE based model use request dispatching to handle context dependencies, switching contexts, and accessing resources in a different context or application. Functions such as JNDI, HTTP sessions, security sessions, servlet application context, and transactions between applications usually use request dispatching.

Figure 10:
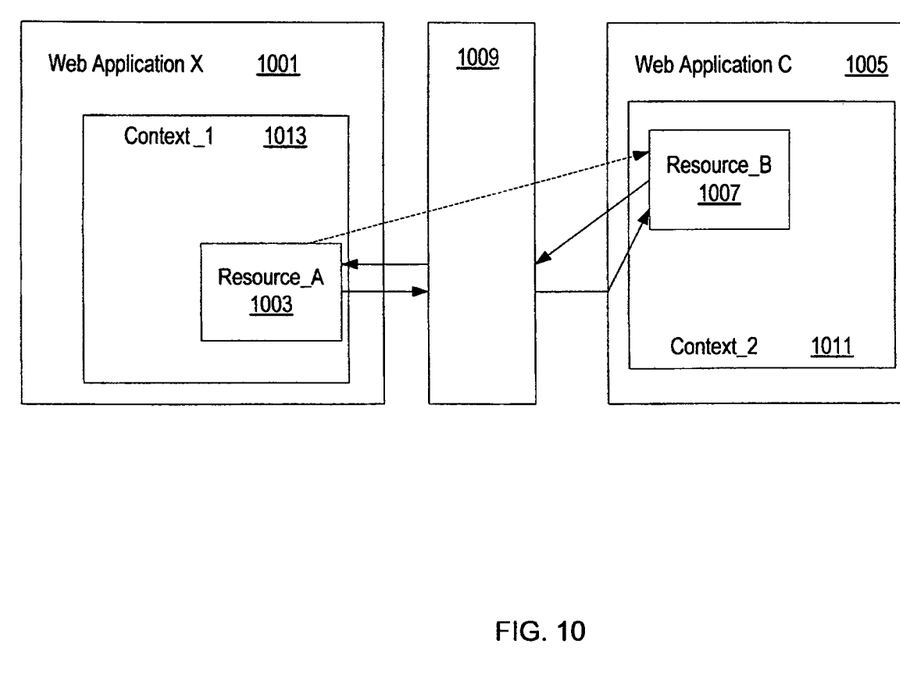
FIG. 10 illustrates an example of request dispatching.

FIG. 10 illustrates an example of request dispatching. Ideally there would be a direct connection between the applications X 1001 and C 1005 that allowed for the access or transfer of resources between them. However, for a variety of reasons (security, physical and logical configurations, etc.) this is not normally possible. Instead, a request dispatch module/logic 1009 is used as a middle man. Exemplary request dispatch modules 1009 include WCEs and Web containers.

In this example, resource_A 1003 of application X 1001 requires resource_B 1007 from application C 1005. As illustrated, the web applications 1001, 1005 utilize different contexts 1013, 1011. Application X 1001 uses the request dispatch module 1009 to pass a request and receive a response for resource_B 1007.

Figure 11:
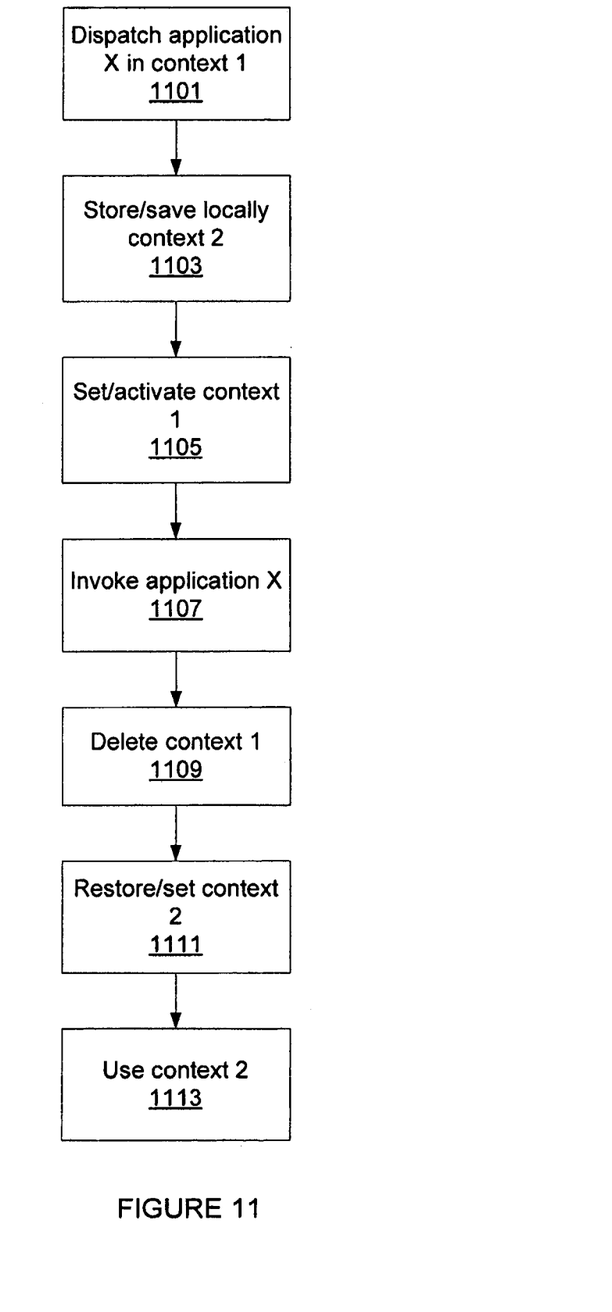
FIG. 11 illustrates an exemplary request dispatching flow.

FIG. 11 illustrates an exemplary request dispatching flow for application X 1001 accessing resource_B 1007 of FIG. 10. Application X 1001 is dispatched in context_1 1013 at 1101. Dispatching may mean execute or deploy and associate with a particular context. Here application X 1001 uses context_1 1013 as its context.

The context that has the desired resource (context_2 1011) is saved locally at 1103. This saving is performed to so that application X 1001 has its own copy of context_2 1011. However, at this time application X 1001 is still associated with context_1 1013 and cannot access context_2 1011.

Context_1 1013 is set or activated at 1105. In other words, context_1 is to be used by application X 1001. In some embodiments this step is skipped if the context is already associated with the application. Application X 1001 is invoked (executed) at 1107.

The association with or the actual context_1 1013 is deleted at 1109. Because of this deletion, application X 1001 no longer has a context associated with it. Context_2 1011 is restored at 1111 and associated with application X 1001 at 1113. Now application X 1001 is using the context information of context_2 1011 and has resource_B 1007.

Closing Comments

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.).

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 12:
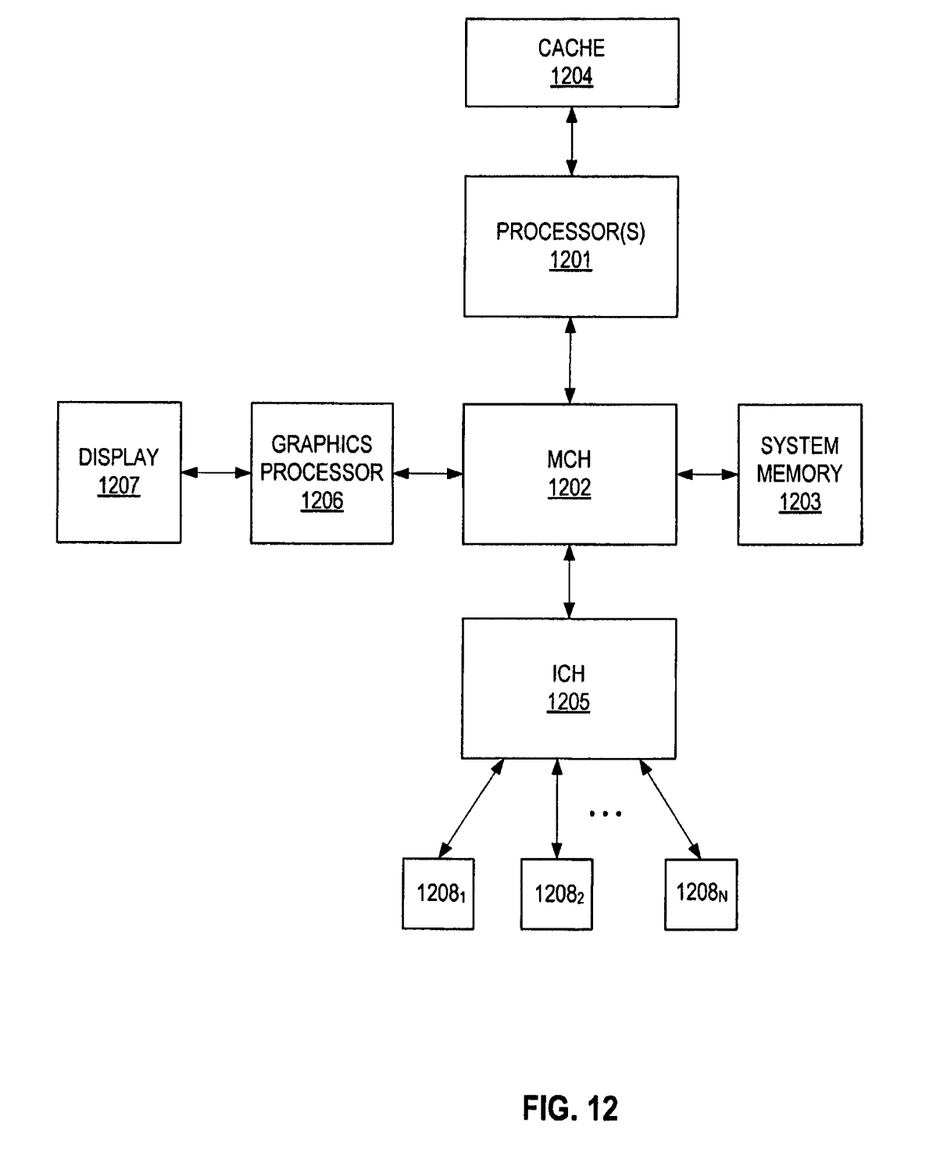
FIG. 12 shows an embodiment of a computing system.

FIG. 12 shows an embodiment of a computing system (e.g., a computer). The exemplary computing system of FIG. 12 includes: 1) one or more processors 1201; 2) a memory control hub (MCH) 1202; 3) a system memory 1203 (of which different types exist such as DDR RAM, EDO RAM, etc,); 4) a cache 1204; 5) an I/O control hub (ICH) 1205; 6) a graphics processor 1206; 7) a display/screen 1207 (of which different types exist such as Cathode Ray Tube (CRT), Thin Film Transistor (TFT), Liquid Crystal Display (LCD), DPL, etc.; 8) one or more I/O devices 1208.

The one or more processors 1201 execute instructions in order to perform whatever software routines the computing system implements. The instructions frequently involve some sort of operation performed upon data. Both data and instructions are stored in system memory 1203 and cache 1204. Cache 1204 is typically designed to have shorter latency times than system memory 1203. For example, cache 1204 might be integrated onto the same silicon chip(s) as the processor(s) and/or constructed with faster SRAM cells whilst system memory 1203 might be constructed with slower DRAM cells. By tending to store more frequently used instructions and data in the cache 1204 as opposed to the system memory 1203, the overall performance efficiency of the computing system improves.

System memory 1203 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1203 prior to their being operated upon by the one or more processor(s) 1201 in the implementation of a software program. Similarly, data that a software program determines should be sent from the computing system to an outside entity through one of the computing system interfaces, or stored into an internal storage element, is often temporarily queued in system memory 1203 prior to its being transmitted or stored.

The ICH 1205 is responsible for ensuring that such data is properly passed between the system memory 1203 and its appropriate corresponding computing system interface (and internal storage device if the computing system is so designed). The MCH 1202 is responsible for managing the various contending requests for system memory 1203 access amongst the processor(s) 1201, interfaces and internal storage elements that may proximately arise in time with respect to one another.

One or more I/O devices 1208 are also implemented in a typical computing system. I/O devices generally are responsible for transferring data to and/or from the computing system (e.g., a networking adapter); or, for large scale non-volatile storage within the computing system (e.g., a hard disk drive). ICH 1205 has bi-directional point-to-point links between itself and the observed I/O devices 1208.

In the foregoing specification, the invention has been described with reference to specific exemplary embodiments thereof. It will, however, be evident that various modifications and changes may be made thereto without departing from the broader spirit and scope of the invention as set forth in the appended claims. For example, while it has been described that the deploy service initiates the deployment, removal, start, and stop of applications, individual Web containers or WCEs may also initiate these tasks. The specification and drawings are, accordingly, to be regarded in an illustrative rather than a restrictive sense.

We claim:

1. A method comprising:
using at least one processor, determining, at a Web container, whether an archive containing an application includes a Web container extension provider descriptor;
determining, based on the archive containing a Web container extension provider descriptor, whether a Web container extension provider indicated by the Web container extension provider descriptor is registered with the Web container, the Web container extension provider providing a Web container extension that includes an interface between the Web container and the application, the Web container extension configured to control a lifecycle of the application based on lifecycle commands received from the Web container; and deploying, using at least one of the lifecycle commands from the Web container to the Web container extension, the application based on the Web container extension provider being registered with the Web container.

2. The method of claim 1, further comprising:
halting deployment based on the Web container extension provider not being registered with the Web container.

3. The method of claim 2, wherein halting deployment further comprises:
rolling back the Web container to a previous state.

4. The method of claim 2, wherein halting deployment further comprises:
rolling back the Web container extension to a previous state.

5. The method of claim 1, further comprising:
deploying the application using conventional techniques based on the Web container extension provider not being registered with the Web container.

6. The method of claim 1, further comprising:
registering the Web container extension provider with the Web container.

7. The method of claim 1, wherein the archive comprises:
at least one public classloader associated with the application; and
at least one private classloader associated with the application.

8. The method of claim 7, further comprising:
registering the public and private classloaders with the Web container.

9. A non-transitory computer-readable storage medium including program code which, when executed by a machine, causes the machine to perform operations comprising:
determining, at a Web container, whether an archive containing an application includes a Web container extension provider descriptor;
determining, based on the archive containing a Web container extension provider descriptor, whether a Web container extension provider indicated by the Web container extension provider descriptor is registered with the Web container, the Web container extension provider providing a Web container extension that includes an interface between the Web container and the application, the Web container extension configured to control a lifecycle of the application based on lifecycle commands received from the Web container; and
deploying, using at least one of the lifecycle commands from the Web container to the Web container extension, the application based on the Web container extension provider being registered with the Web container.

10. The non-transitory computer-readable storage medium of claim 9, wherein the operations further comprise:
halting deployment based on the Web container extension provider not being registered with the Web container.

11. The non-transitory computer-readable storage medium of claim 10, wherein halting deployment further comprises:
rolling back the Web container to a previous state.

12. The non-transitory computer-readable storage medium of claim 11, wherein halting deployment further comprises:
rolling back the Web container extension to a previous state.

13. The non-transitory computer-readable storage medium of claim 9, wherein the operations further comprise:
deploying the application using conventional techniques based on the Web container extension provider not being registered with the Web container.

14. The non-transitory computer-readable storage medium of claim 9, wherein the operations further comprise:
registering a Web container extension provider with the Web container.

15. The non-transitory computer-readable storage medium of claim 9, wherein the archive comprises:
at least one public classloader associated with the application; and
at least one private classloader associated with the application.

16. The non-transitory computer-readable storage medium of claim 15, wherein the operations further comprise:
registering the public and private classloaders with the Web container.

17. A system, comprising:
at least one processor;
memory; and
at least one program stored in the memory, the at least one program comprising instructions to be executed by the at least one processor to:
determine, at a Web container, whether an archive containing an application includes a Web container extension provider descriptor;
determine, based on the archive containing a Web container extension provider descriptor, whether a Web container extension provider is registered with the Web container, the Web container extension provider providing a Web container extension that includes an interface between the Web container and the application, the Web container extension configured to control a lifecycle of the application based on lifecycle commands received from the Web container; and
deploy, using at least one of the lifecycle commands from the Web container to the Web container extension, the application based on the Web container extension provider being registered with the Web container.

18. The system of claim 17, further comprising instructions to:
halt deployment based on the Web container extension provider not being registered with the Web container.

19. The system of claim 18, wherein the instructions to halt deployment include instructions to roll back the Web container to a previous state.

20. The system of claim 18, wherein the instructions to halt deployment include instructions to roll back the Web container extension to a previous state.

* * * * *